Dec. 9, 1924.                                                    1,518,840
O. E. DE RIDDER
METHOD OF MAKING SHOES AND AN INNERSOLE USED IN SUCH METHOD
Filed Feb. 20, 1922          3 Sheets-Sheet 1
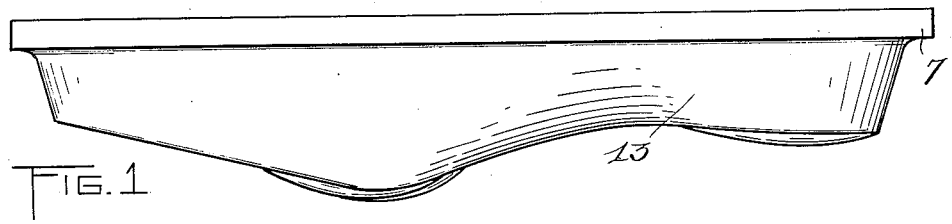
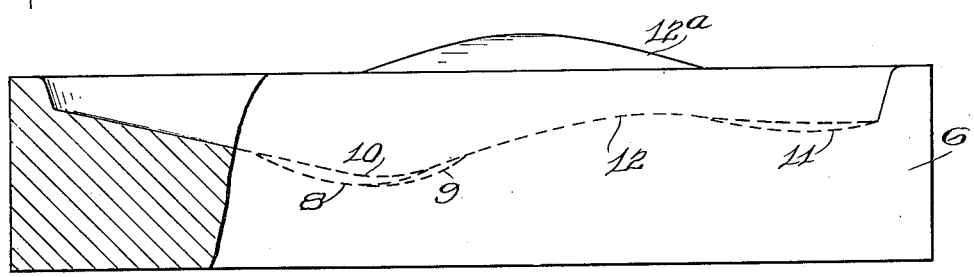
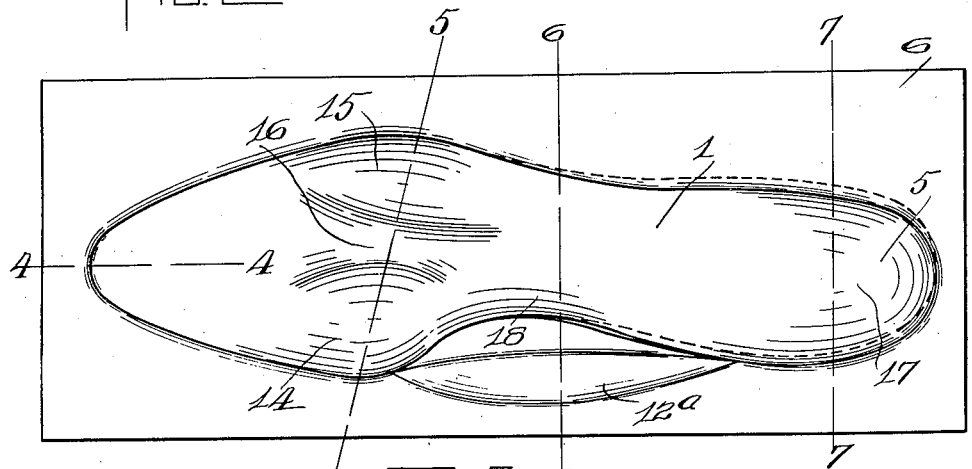
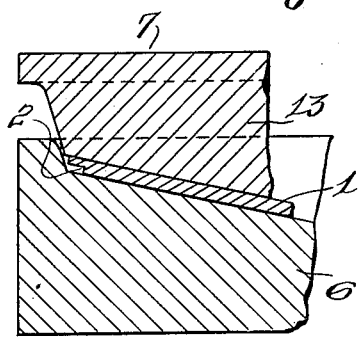
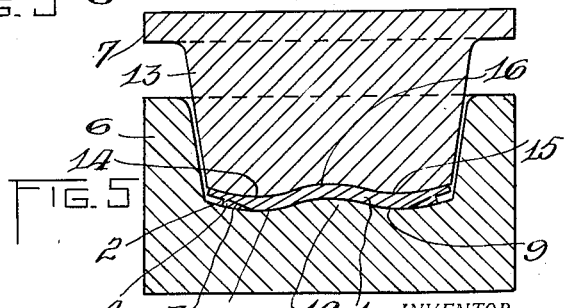
INVENTOR.
Oliver E. de Ridder
BY Davis & Simms
his ATTORNEYS.

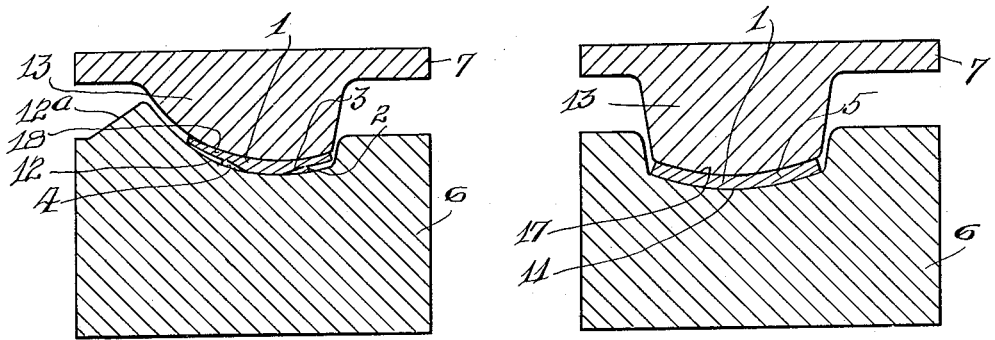
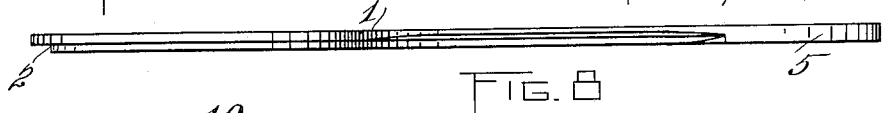
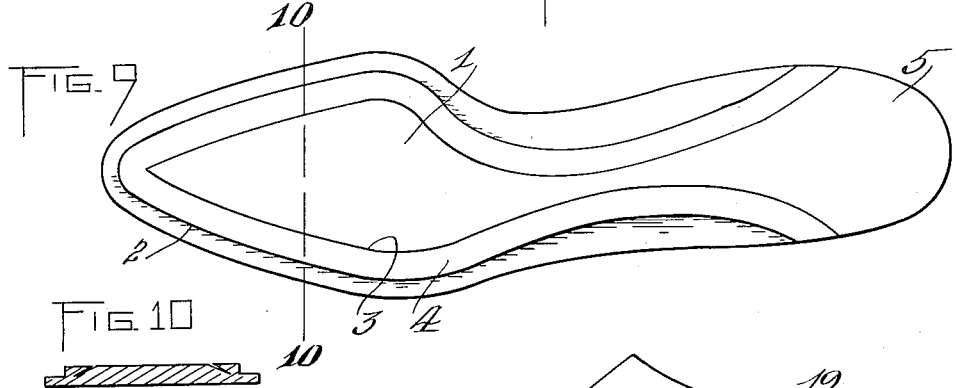
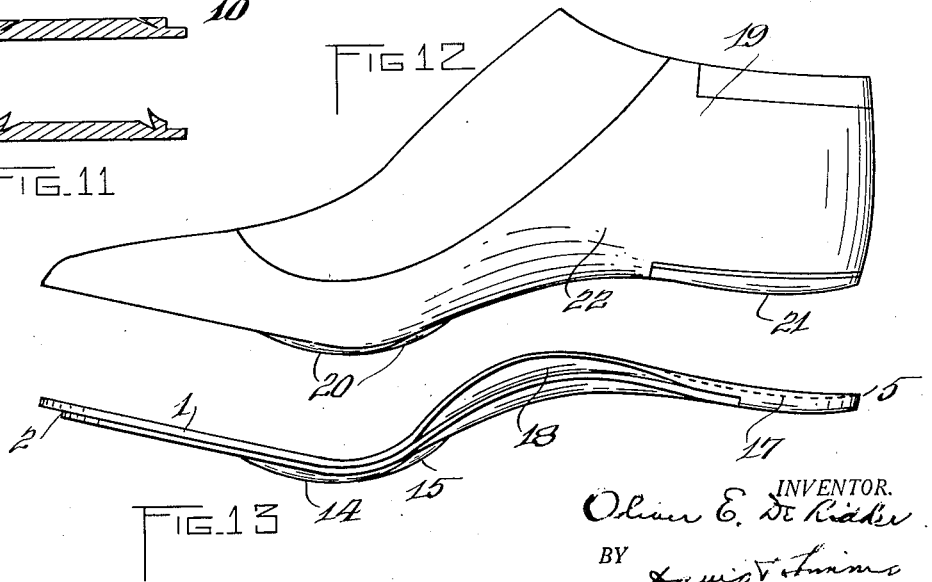

Dec. 9, 1924.
O. E. DE RIDDER
1,518,840
METHOD OF MAKING SHOES AND AN INNERSOLE USED IN SUCH METHOD
Filed Feb. 20, 1922  3 Sheets-Sheet 3
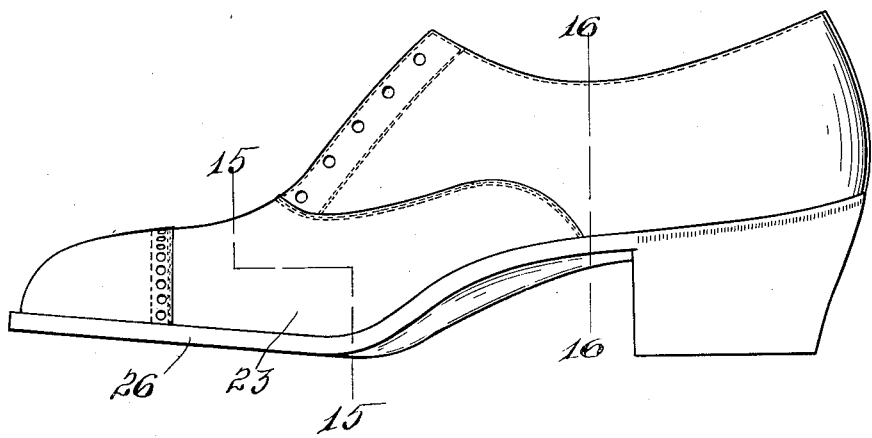
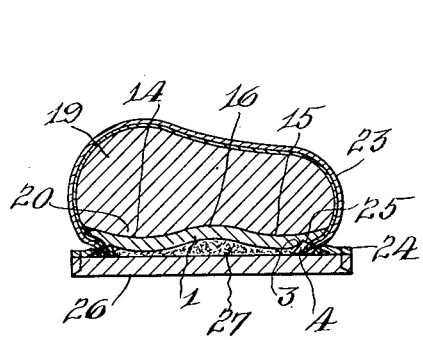
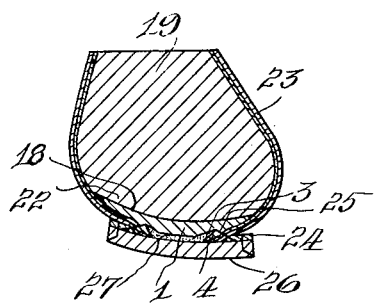
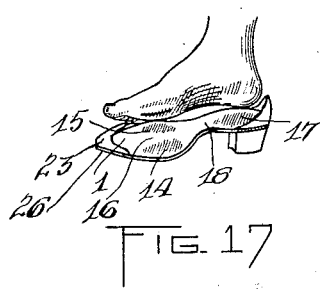
INVENTOR.
Olivier E. De Ridder
BY Davis & Simms
his ATTORNEYS.

Patented Dec. 9, 1924.

1,518,840

UNITED STATES PATENT OFFICE.

OLIVER E. DE RIDDER, OF ROCHESTER, NEW YORK.

METHOD OF MAKING SHOES AND AN INNERSOLE USED IN SUCH METHOD.

Application filed February 20, 1922. Serial No. 537,672.

*To all whom it may concern:*

Be it known that I, OLIVER E. DE RIDDER, a citizen of the United States, and resident of Rochester, in the county of Monroe and State of New York, have invented certain new and useful Improvements in Methods of Making Shoes and Innersoles Used in Such Methods, of which the following is a specification.

The present invention relates to a method of making shoes and to an inner sole used in such method. An object of the invention is to provide a method of making shoes in which the inner sole is molded to a desired shape before being applied to the last. Another object of the invention is to provide an inner sole which has a molded portion formed to fit and support the metatarsal arch of the foot. Still another object of the invention is to provide an inner sole which has a molded portion formed to fit the main arch of the foot and a molded portion formed to fit the metatarsal arch of the foot. A further object of the invention is to provide an inner sole molded before the application thereof to the last to provide a portion formed to fit the main arch of the foot. A still further object of the invention is to provide a new method of making shoes in which the inner sole of the shoe is molded prior to its application to the last in order to provide proper support for the main and metatarsal arch of the foot. Another and still further object of the invention is to provide a sole molded before the application thereof to the last and having two depressions or hollows directly under the inside and the outside part of the metatarsal arch with the last portion between the two depressions to give direct support to the metatarsal arch, thereby relieving the tender part of the balls of the foot from carrying the entire weight and giving strength to the metatarsal arch.

To these and other ends, the invention consists of certain parts and combinations of parts, all of which will be hereinafter described: the novel features being pointed out in the appended claims.

In the drawings:

Fig. 1 is a side view of the male member of the mold;

Fig. 2 is a side view of the female member of the mold with the part in section;

Fig. 3 is a top view of the female member of the mold with an inner sole inserted;

Fig. 4 is a section on the line 4—4, Fig. 3, showing the male member in position;

Fig. 5 is a section on the line 5—5, Fig. 3 with the male member in position;

Fig. 6 is a section on the line 6—6, Fig. 3 with the male member in position;

Fig. 7 is a section on the line 7—7, Fig. 3 with the male member in position;

Fig. 8 is an edge view of an inner sole employed in this invention, showing such inner sole prior to the molding operation;

Fig. 9 is a view of the under side of the inner sole;

Fig. 10 is a section on the line 10—10, Fig. 9;

Fig. 11 is a similar section showing the tongue or lip turned up after the molding operation;

Fig. 12 is a side view of a last employed in this invention;

Fig. 13 is an edge view of the inner sole after the latter has been molded;

Fig. 14 is a side view of a shoe embodying this invention;

Fig. 15 is a section on the line 15—15, Fig. 14;

Fig. 16 is a section on the line 16—16, Fig. 14; and

Fig. 17 is a perspective fragmentary view with the foot situated in proximity thereto for the purpose of indicating the manner in which the foot is received in the shoe.

The invention is illustrated as employing an inner sole 1, which preferably before molding is a flat piece of material, such as leather, reduced or cut at the toe portion and on opposite sides in advance of the heel to provide a shoulder 2 and having an inclined kerf or cut 3 on the inner side of the shoulder and substantially parallel therewith, to provide between the shoulder and the kerf a lip or rib 4 to which the upper and the welt may be secured in the usual manner. This inner sole differs from the common inner sole in two particulars, first, the heel portion 5 is shifted outwardly slightly with reference to the toe portion of the inner sole and the shoulder 2 on the inner side of the arch is farther removed from the inner edge of the sole than is customary.

The inner sole, before the lip 4 is deflated in the manner shown in Fig. 11, is moistened and then molded to secure a fixed form to the latter before said inner sole is applied to the last. The mold may employ a female member 6 and a male member 7. The female member has in the forward portion thereof two depressions 8 and 9, the depression 8 being on the inner side of the sole and the depression 9 on the outer side, the mold between said two depressions being elevated at 10. The female member 6 also has in the heel portion of its pocket a depression 11. Between the heel and the heel depression 11 and the depressions 8 and 9, the bottom of the mold pocket is arched at 12 and this arched portion is curved, transversely, the curve on the inner side of the arch being more extreme than that on the outside and extending upwardly onto a projection 12$^a$. The pocket of the female member has an outline similar to that of the inner sole to be molded, except that the heel portion is shifted inwardly slightly with reference to the heel portion of the inner sole and occupies substantially the position of the heel portion of the inner sole used in shoes now manufactured. The male member 7 has its projecting portion 13 formed to correspond with the pocket of the female member, so as to fit snugly therein.

In molding the inner sole, the latter is moistened and then placed in the female member, the toe portion being inserted first and then the heel portion which is required to be shifted laterally from the position shown in dotted lines in Fig. 3, in the pocket. This produces a bulge in the inner sole on the inner side of the arch and, when the projecting portion 13 of the male member is fitted in the pocket or socket of the female member, the inner sole is caused to assume a shape corresponding to the opposed portions of the walls of the male and the female member. This shape is shown in Fig. 13 and Figs. 4 to 7 inclusive, the inner sole having a depressed portion 14 for the inner side of the metatarsal arch, a depression 15 for the outside of the metatarsal arch and an elevated portion 16 for the portion of the arch between said depressed portion. The heel of the inner sole has a depression 17 for the heel, and the arch of the inner sole is deflected upwardly at 18 to conform to the foot arch.

After the inner sole is removed from the mold and before it is dry, it may be fitted to a last and a sharp tool may be introduced into the kerf 3 to form the lip shown in Fig. 11.

It will be seen that the form of inner sole employed particularly lends itself to this molding action as the lip or rib may be provided after the molding. It would be difficult to provide this lip on the inner sole before the molding, as the molding action would break the same down.

One of the lasts is indicated at 19, Fig. 12. This last differs from the ordinary last in having on its under side two projections 20 at the ball of the foot and a projection 21 at the heel for fitting in the depressions 14, 15 and 17 in the upper face of the inner sole. Between the projections 20, the last is curved or arched to conform to the ridge or projection 16 on the inner sole; and, at the main arch of the last, the latter is curved at 22 to conform to the lip 18 on the inner side of the arched portion of the inner sole. Owing to the fact that the inner sole is molded before it is applied to the last 19, it is only necessary to secure the inner sole by a few tacks as is common in the ordinary lasting operation.

The inner sole then has the upper 23 secured thereto. This upper with a welt 24 is stitched in the usual manner at 25 to the lip or tongue 4, the outer sole 26 then being secured in place with a filler 27 being inserted between the inner sole and the outer sole. This filler is thinner at the higher points on the under face of the inner sole and thicker at the lower points so that it tends to maintain the shape of such inner sole.

It is apparent that with the shoe constructed in accordance with this invention, the hollows or depressions with the raised portions between them provide a direct support or bearing for the metatarsal arch thereby relieving the tender part of the ball from carrying the entire weight and giving great strength to the arch at this point. Where a large joint or bunion exists, the foot will fall naturally into the depression on the inside of the shoes and distribute the pressure uniformly thus reducing the joints to normal. The shoe is not provided with any metal shank stiffener, but the main arch of the foot is supported by the formation of the inner sole which conforms to the inner face of the arch and, owing to the manner in which the main shoe arch is formed in molding, maintains this portion against breaking down after the shoe has been worn. Furthermore, the elimination of the metal shank gives a flexibility to the shoe which eases the action of walking. The heel rests in a cup portion or depression in the inner sole and this depression with the two forward depressions gives to the foot what might be called a three point suspension evenly distributing the weight and throwing the body in perfect balance. Owing to the construction of the main arch of the inner sole, the heel of the shoe seeks to accommodate itself to the surface with which it is brought into contact irrespective of the position of the shoe so that the heel wears evenly and does not wear over on one side. With the foot resting in the depressions, there is created in effect a ball and socket action, which will prevent the main arch of the foot from slipping forward at its front end in the shoe and thereby gradually breaking down such foot arch.

What I claim as my invention and desire to secure Letters Patent is:—

1. A method of making shoes which consists in providing an inner sole reduced at its toe portion and at opposite sides in advance of the heel to provide a shoulder and having an inclined kerf or cut on opposite sides of the shoulder substantially parallel with the shoulder, the heel of the inner sole being shifted outward slightly with reference to the toe portion of the inner sole, moistening the inner sole, molding by pressure the inner sole to the desired shape with the heel portion shifted to the position it will occupy in the complete shoe in order to produce an arch on the inner side of the inner sole, forming a lip on the under side of the inner sole from the material between the kerf and the shoulder after such molding, stitching the upper to the lip, and then completing the other operations of making the shoe.

2. A method of making shoes which consists of molding an inner sole to provide depressions for receiving opposite sides of the metatarsal arch and a curved portion between said depressions for supporting said metatarsal arch, applying the molded inner sole to a last which will maintain the molded form of the inner sole, stitching the upper to the molded inner sole while on said last, and thereafter completing the operations of making the shoe.

3. A method of making shoes which consists in providing an inner sole whose heel portion is shifted outwardly slightly with reference to the completed shoe, molding the inner sole to produce an arch on the inner side of the inner sole and to shift the heel portion inwardly relatively to the forward portion to the position the inner sole will occupy in the completed shoe, thereafter applying the molded inner sole to a last which will maintain the molded form of the inner sole, stitching the upper to the molded inner sole, while on said last and then completing the other operations of making the shoe.

4. A method of making shoes which consists in molding an inner sole to provide depressions to receive opposite sides of the metatarsal arch, a curved portion between such depressions for supporting the metatarsal arch, and a main arch portion for fitting the main arch of the foot, applying the molded inner sole to a last which will maintain the molded form of the inner sole, stitching the upper to the molded inner sole, while on the last and thereafter completing the operations of making the shoe.

5. A method of making shoes which consists in providing an inner sole, whose heel portion is shifted outwardly slightly with reference to the completed shoe, molding the inner sole to shift the heel portion inwardly relatively to the forward or toe portion to the position the inner sole will occupy in the completed shoe, molding the inner sole to produce an arch on the inner side of the inner sole and to produce depressions in the forward portion to receive the inner and outer sides of the metatarsal arch of the foot, thereafter applying the molded inner sole to a last which will maintain the molded form of the inner sole, stitching the upper to the inner sole while on the last and then completing the other operations of making the shoe.

6. A method of making shoes which consists in providing an inner sole reduced at the toe portion and on opposite sides in advance of the heel to provide a shoulder and having an inclined kerf or cut on the inside of the shoulder substantially parallel with said shoulder, the heel portion of the inner sole being shifted outwardly slightly with reference to the completed shoe, molding the inner sole to shift the heel portion inwardly relatively to the forward toe portion to the position the toe portion will occupy in the completed shoe and to produce an arch on the inner side of the inner sole, a depression in the heel portion and depressions in the forward portion to receive the inner and outer sides of the metatarsal arch of the foot, fitting the inner sole to a last formed to correspond to the molded upper surface of the inner sole, forming a lip on the under side of the inner sole from the material between the kerf and the shoulder, stitching the upper to the lip while the inner sole is on the last and then completing the other operations of making the shoe.

OLIVER E. DE RIDDER.